US007693633B2

(12) United States Patent
Donnelli et al.

(10) Patent No.: US 7,693,633 B2
(45) Date of Patent: Apr. 6, 2010

(54) MACHINE OPERATIONAL DATA COLLECTION AND REPORTING SYSTEM

(75) Inventors: Aaron M. Donnelli, Peoria, IL (US); Daniel C. Wood, East Peoria, IL (US); Anthony D. McNealy, Peoria, IL (US); Alan L. Ferguson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 965 days.

(21) Appl. No.: 11/287,343

(22) Filed: Nov. 28, 2005

(65) Prior Publication Data

US 2007/0124050 A1 May 31, 2007

(51) Int. Cl.
*G06F 19/00* (2006.01)

(52) U.S. Cl. ........................................................ 701/50

(58) Field of Classification Search ................... 701/50, 701/213–215, 23; 340/988; 342/357.06, 342/357.12

See application file for complete search history.

(56) References Cited

U.S. PATENT DOCUMENTS 4,462,079 A * 7/1984 Ito et al. ..................... 701/123
4,831,539 A 5/1989 Hagenbuch
5,646,844 A 7/1997 Gudat et al.
6,226,572 B1 * 5/2001 Tojima et al. ................. 701/23
6,529,812 B1 3/2003 Koehrsen et al.
6,631,402 B1 10/2003 Devine et al.
6,646,564 B1 11/2003 Azieres et al.
6,697,894 B1 2/2004 Mitchell et al.
6,751,541 B2 6/2004 Komatsu et al.
7,398,137 B2 * 7/2008 Ferguson et al. ............ 700/275
2003/0069680 A1 4/2003 Cohen et al.
2004/0040792 A1 3/2004 Uranaka et al.

FOREIGN PATENT DOCUMENTS

EP 1403437 3/2004

* cited by examiner

*Primary Examiner*—Yonel Beaulieu
(74) *Attorney, Agent, or Firm*—Finnegan, Henderson, Farabow, Garrett & Dunner

(57) ABSTRACT

A data system for work machines is disclosed. The data system has a first communication device associated with a first work machine, and a second communication device associated with a second work machine. The data system also has an offboard system in communication with the first and second communication devices. The offboard system is configured to request a first data transmission from the first work machine in response to a second data transmission being received from the second work machine.

16 Claims, 5 Drawing Sheets

MACHINE OPERATIONAL DATA COLLECTION AND REPORTING SYSTEM

TECHNICAL FIELD

The present disclosure relates generally to a reporting system, and more particularly, to a system for collecting and reporting historical operational data of a work machine.

BACKGROUND

Work machines such as, for example, wheel loaders, track type tractors, on-highway trucks, and other types of machinery are often equipped with sensors for measuring various operating conditions of the work machine. These operating conditions could include, for example, engine RPM, oil pressure, water temperature, boost pressure, oil contamination levels, electric motor current, hydraulic pressures, system voltage, fuel consumption, payload, ground speed, transmission ratio, cycle time, global position, and the like. Processors and communications devices may be provided on the work machine for receiving the operating conditions, processing data associated with the operating conditions, and communicating the processed data to an offboard system for evaluation of machine performance.

One such system is described in U.S. Pat. No. 6,751,541 (the '541 patent) by Komatsu et al., issued on Jun. 15, 2004. In particular, the '541 patent describes a system for transmitting operational data of a working machine. The system includes a CPU arranged on a working machine to produce operation data in accordance with signals output from various sensors. This data is stored in a memory unit on the basis of time, depending upon the day. The data is then outputted via a satellite from the working machine to an earth station. It is possible to set different transmitting times for individual working machines so that the operation data can be transmitted from individual working machines to the earth station without overlapping.

Although the transmitting system of the '541 patent may sufficiently transmit operational data for a particular working machine, it may do so inefficiently. Specifically, a transmission of data from one working machine may only be desired or useful based on a transmission of data from another working machine or when the working machine is in a specific geographical region. Because the transmitting system of the '541 patent always transmits at the preset time regardless of these other conditions, it may occasionally transmit unnecessarily or undesirably.

The disclosed system is directed to overcoming one or more of the problems set forth above.

SUMMARY OF THE INVENTION

In one aspect, the present disclosure is directed to a data system that includes a first communication device associated with a first work machine, and a second communication device associated with a second work machine. The data system also includes an offboard system in communication with the first and second communication devices. The offboard system is configured to request a first data transmission from the first work machine in response to a second data transmission being received from the second work machine.

In another aspect, the present disclosure is directed to a method of reporting data for a work machine. The method includes receiving a first data transmission from a first work machine and requesting a second data transmission from a second work machine in response to the first data transmission.

In yet another aspect, the present disclosure is directed to a data system that includes at least one sensing device, a communication device, and a locating device. The at least one sensing device is configured to generate a signal indicative of an operational condition of the work machine. The communication device is configured to receive the signal and transmit data corresponding to the signal to an offboard system. The locating device is configured to determine a location of the work machine. The communication device only transmits data in response to the determined location of the work machine.

In another aspect, the present disclosure is directed to a method of reporting data for a work machine. The method includes receiving a signal indicative of an operational condition of a work machine. The method also includes determining a location of the work machine and transmitting data corresponding to the signal to an offboard system in response to the determined location of the work machine.

DETAILED DESCRIPTION

Figure 1:
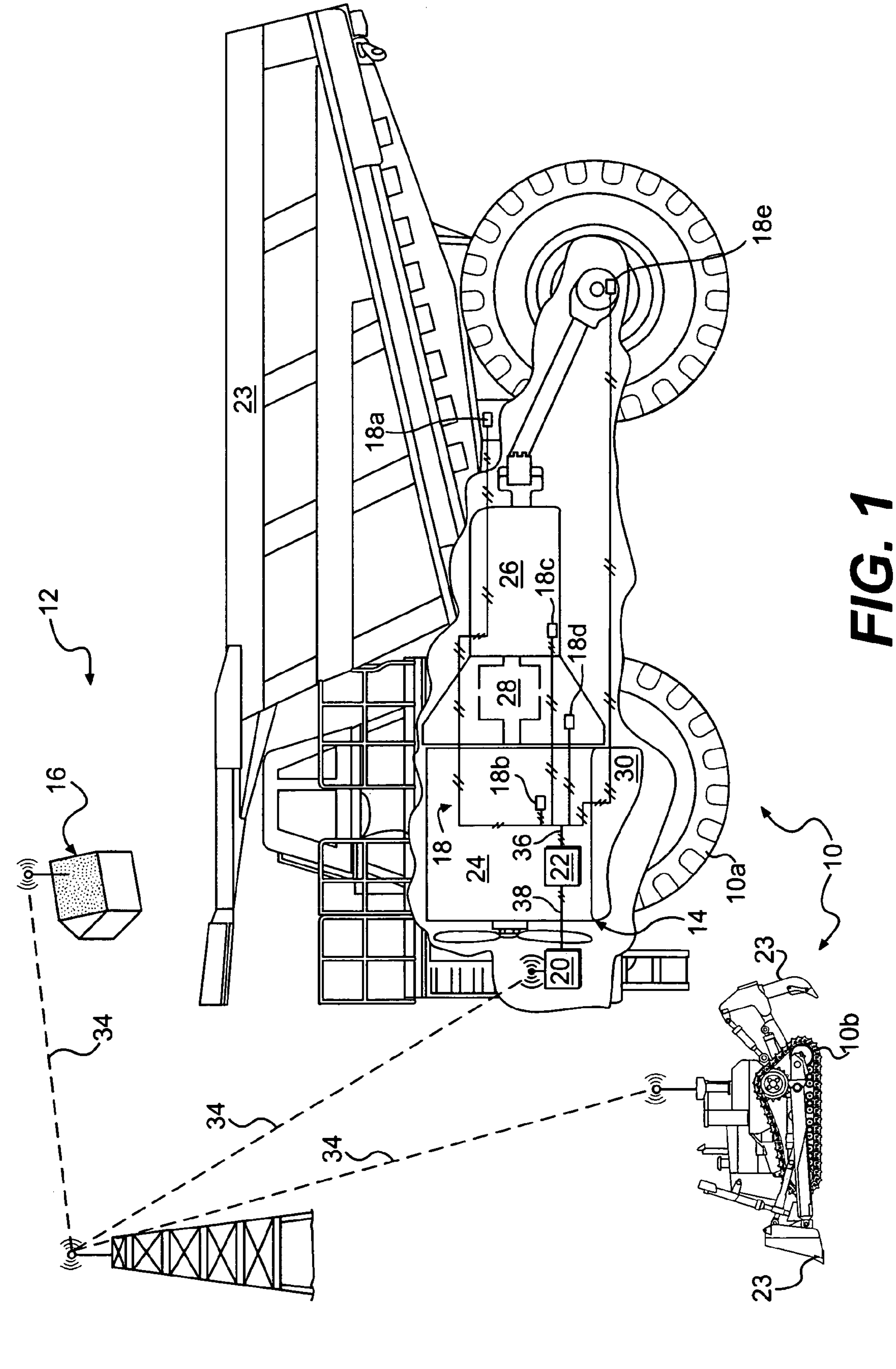
FIG. 1 is a diagrammatic and schematic illustration of an exemplary disclosed data system.

FIG. 1 illustrates an exemplary disclosed data system 12 for use with one or more work machines 10. Each work machine 10 may embody a stationary or mobile machine configured to perform some type of operation associated with an industry such as mining, construction, farming, transportation, power generation, or any other industry known in the art. For example, work machine 10 may be an earth moving machine such as an on or off-highway haul truck 10*a*, a dozer 10*b*, a loader, a backhoe, an excavator, a motor grader, or any other earth moving machine. Work machine 10 may alternatively embody a stationary generator set, pumping mechanism, or other suitable operation-performing machine.

Data system 12 may include subsystems that communicate to automatically gather and report information from work machine 10 during operation of work machine 10. For example, data system 12 may include an onboard data collection system 14 associated with each work machine 10, and a central offboard control system 16. It is contemplated that multiple offboard control systems 16 may alternatively be implemented, if desired.

Each onboard data collection system 14 may include an interface module 18, a communication module 20, and a controller 22 configured to communicate with off-board control system 16 via communication module 20. It is contemplated that one or more of interface module 18, communication module 20, and controller 22 may be integrated as a single unit, if desired. It is further contemplated that onboard data collection system 14 may include additional or different components than those illustrated within FIG. 1.

Interface module 18 may include a plurality of sensing devices 18*a-e* distributed throughout work machine 10 and configured to gather data from various components, subsystems, and/or operators of work machine 10. Sensing devices 18_a-e_ may be associated with, for example, a work implement 23, a power source 24, a transmission 26, a torque converter 28, a fluid supply 30, a suspension system (not shown), an operator's controller or input device (not shown), and/or other components and subsystems of work machine 10. These sensing devices 18_a-e_ may be configured to automatically gather operational information from the components and subsystems of work machine 10 including implement, engine, and/or work machine speed or location; fluid (i.e., fuel, oil, etc.) pressures, flow rates, temperatures, contamination levels, viscosities, and/or consumption rates; electric current and voltage levels; loading levels (i.e., payload value, percent of maximum allowable payload limit, payload history, payload distribution, etc.); transmission output ratio; cycle time; grade; performed maintenance and/or repair operations; and other such pieces of information. Additional information may be generated or maintained by interface module 18 such as, for example, time of day, date, and operator information. Each of the gathered pieces of information may be indexed relative to the time, day, date, operator information, or other pieces of information to trend the various operational aspects of work machine 10.

Communication module 20 may include any device configured to facilitate communications between controller 22 and off-board control system 16. Communication module 20 may include hardware and/or software that enables communication module 20 to send and/or receive data messages through a wireless communication link 34. The wireless communications may include satellite, cellular, infrared, and any other type of wireless communications that enables controller 22 to wirelessly exchange information with off-board control system 16.

Controller 22 may include any means for monitoring, recording, storing, indexing, processing, and/or communicating the operational aspects of work machine 10 described above. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from types of computer program products or computer-readable media, such as computer chips and secondary storage devices, including hard disks, floppy disks, optical media, CD-ROM, or other forms of RAM or ROM.

Controller 22 may be in communication with the other components of data collection system 14. For example, controller 22 may be in communication with interface module 18 and with communication module 20 via communication lines 36 and 38, respectively. Various other known circuits may be associated with controller 22 such as, for example, power supply circuitry, signal-conditioning circuitry, solenoid driver circuitry, communication circuitry, and other appropriate circuitry.

Figure 2:
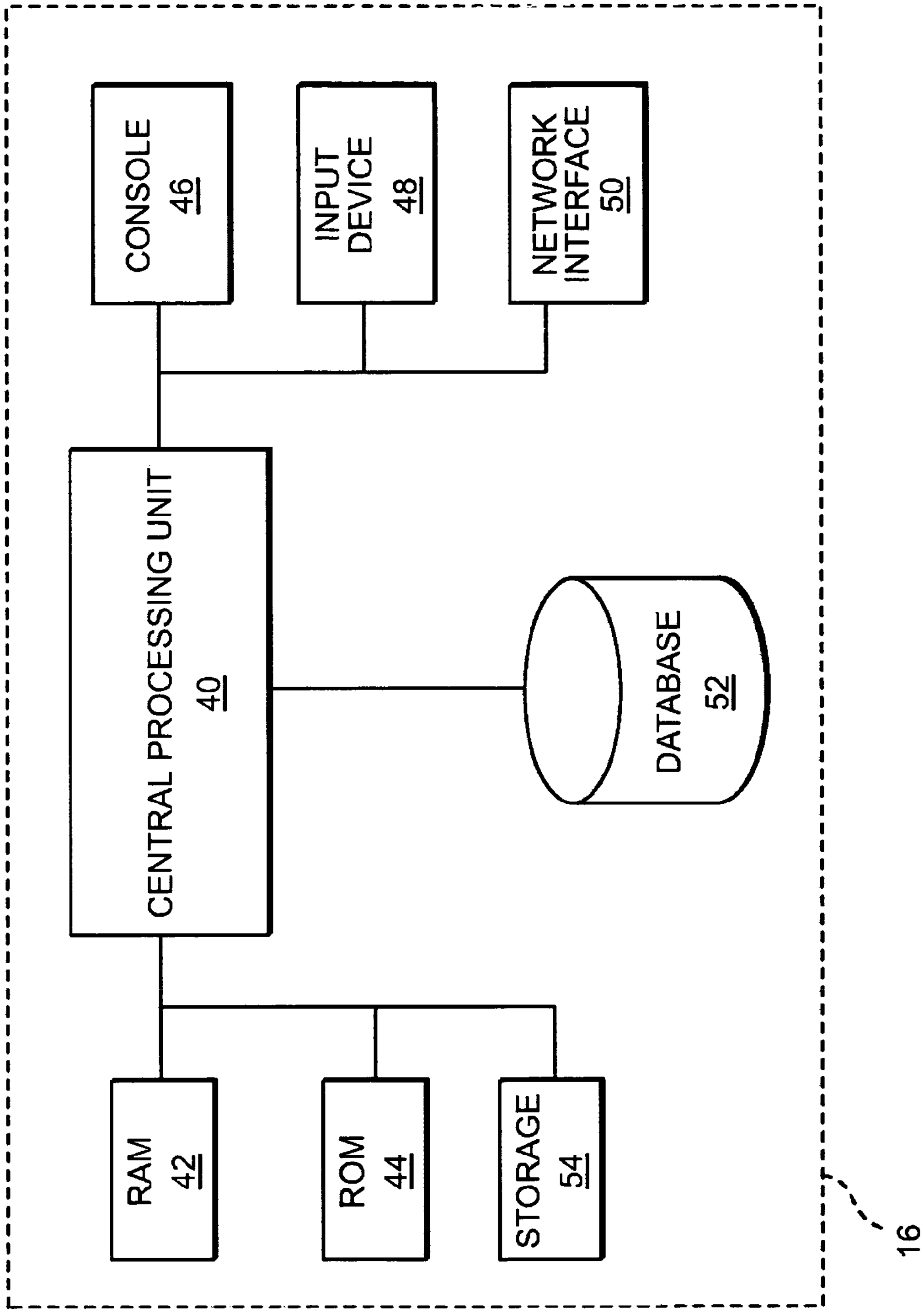
FIG. 2 is a diagrammatic illustration of an offboard control system for use with the data system of FIG. 1.

Off-board control system 16 may represent one or more computing systems of a business entity associated with work machine 10, such as a manufacturer, dealer, retailer, owner, or any other entity that generates, maintains, sends, and/or receives information associated with the operation of work machine 10. The one or more computing systems may include, for example, a laptop computer, a work station, a personal digital assistant, a mainframe, and other computing systems known in the art. As illustrated in the example of FIG. 2, off-board control system 16 may include a central processing unit (CPU) 40, a random access memory (RAM) 42, a read-only memory (ROM) 44, a console 46, an input device 48, a network interface 50, a database 52, and a storage 54. It is contemplated that off-board control system 16 may include additional, fewer, and/or different components than what is listed above. It is understood that the type and number of listed devices are exemplary only and not intended to be limiting.

CPU 40 may execute sequences of computer program instructions to perform various processes that will be explained below. The computer program instructions may be loaded into RAM 42 for execution by CPU 40 from ROM 44.

Storage 54 may embody any appropriate type of mass storage provided to store information CPU 40 may need to perform the processes. For example, storage 54 may include one or more hard disk devices, optical disk devices, or other storage devices that provide storage space.

Off-board control system 16 may interface with a user via console 46, input device 48, and network interface 50. In particular, console 46 may provide a graphics user interface (GUI) to display information to users of off-board control system 16. Console 46 may be any appropriate type of computer display device or computer monitor. Input device 48 may be provided for users to input information into off-board control system 16. Input device 48 may include, for example, a keyboard, a mouse, or other optical or wireless computer input devices. Further, network interface 50 may provide communication connections such that off-board control system 16 may be accessed remotely through computer networks.

Database 52 may contain model data and any information related to data records under analysis. Database 52 may also include analysis tools for analyzing the machine performance information stored within database 52. CPU 40 may use database 52 to determine historic relations or trends relating to fluid consumption rates; work machine repair and/or maintenance history; loading, stresses, and/or wear on components of work machine 10; hours of use; and other such pieces of real time machine usage information.

Figure 3:
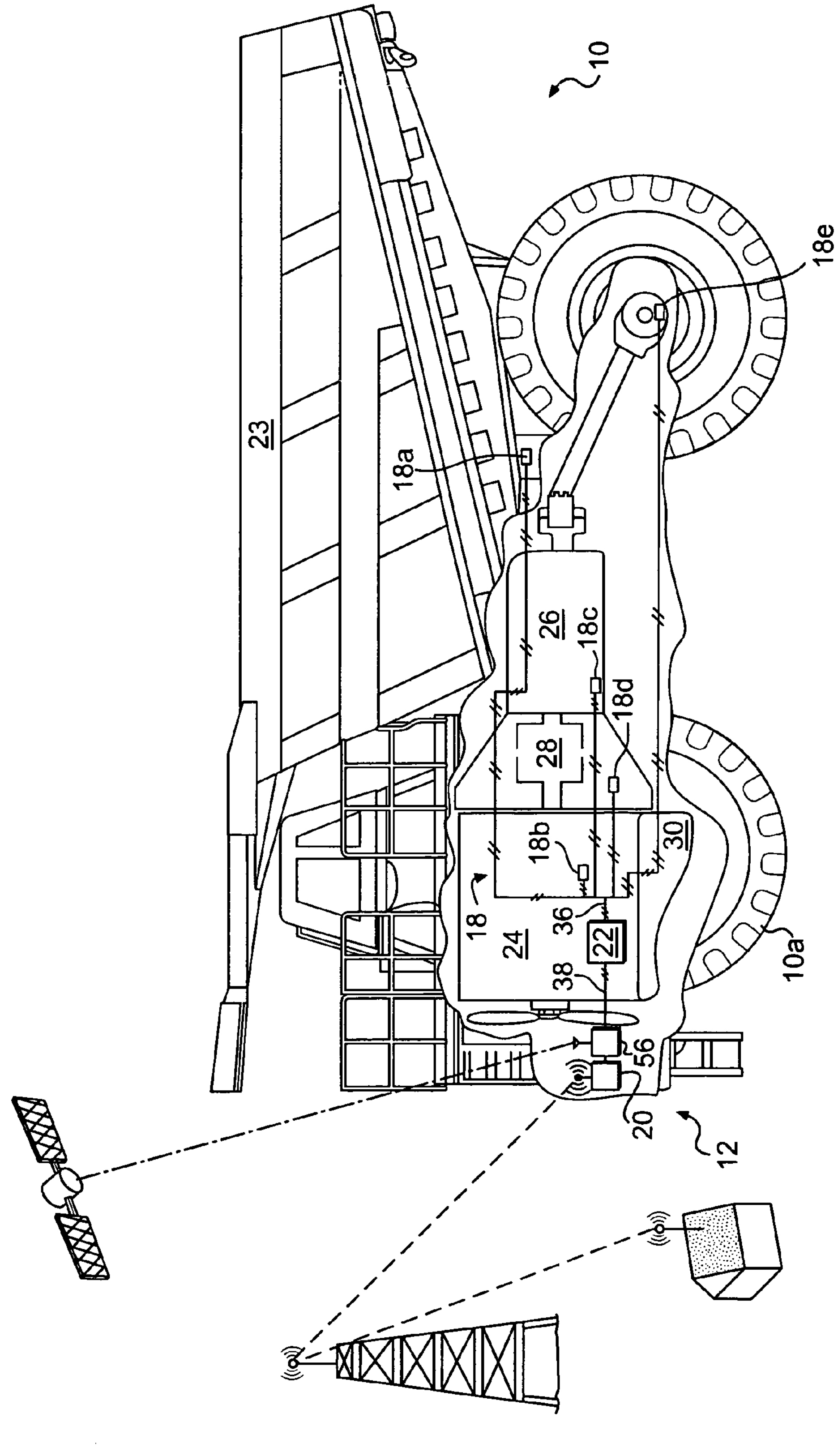
FIG. 3 is a diagrammatic and schematic illustration of another exemplary disclosed data system.

FIG. 3 illustrates an alternative embodiment of data system 12. Similar to data system 12 of FIG. 1, data system 12 of FIG. 3 includes interface module 18, communication module 20, and controller 22. However, in contrast to data system 12 of FIG. 1, data system 12 of FIG. 3 may also include a locating device 56 configured to determine and communicate a location of work machine 10 to offboard control system 16. For example, locating device 56 could include a Global Positioning System (GPS), an Inertial Reference Unit (IRU), or any other known locating device. Locating device 56 may be in communication with controller 22 via a communication line 58.

Figure 4:
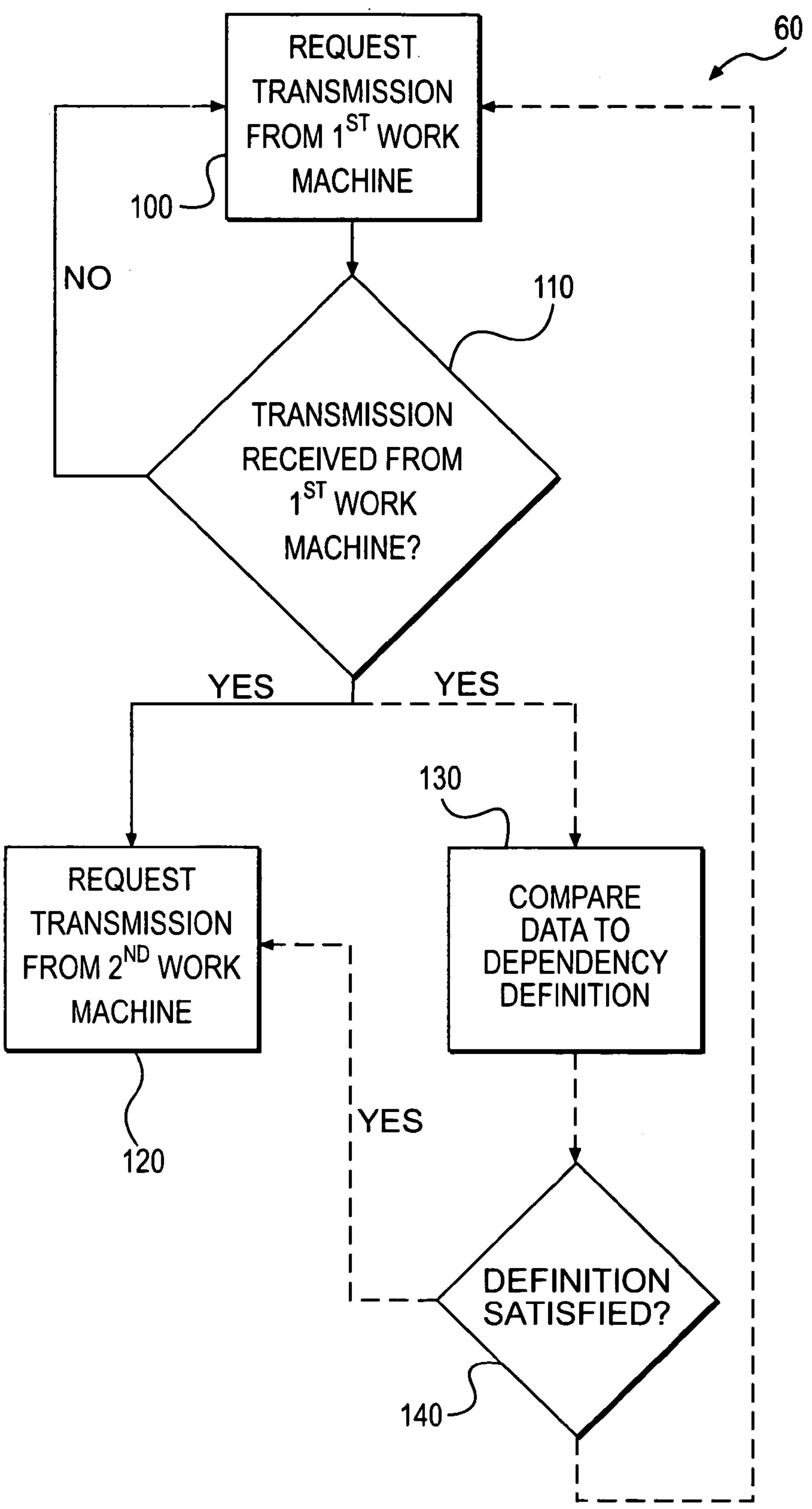
FIG. 4 is a flowchart depicting an exemplary disclosed method of operating the data system of FIG. 1.
Figure 5:
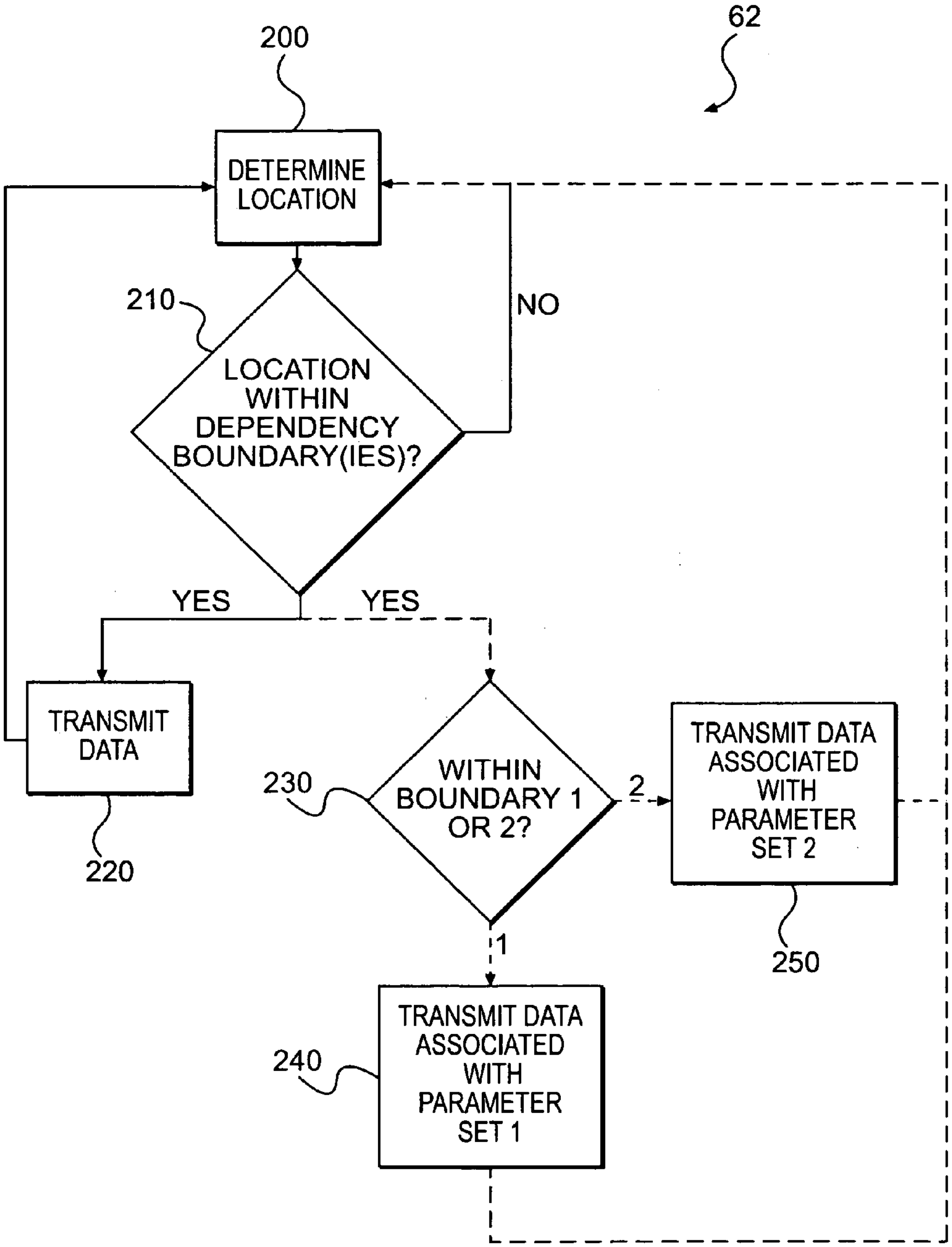
FIG. 5 is a flowchart depicting an exemplary disclosed method of operating the data system of FIG. 3.

FIGS. 4 and 5 illustrate flowcharts 60 and 62, which depict exemplary methods of operating data system 12. Flowcharts 60 and 62 will be discussed in the following section to further illustrate the disclosed systems and their operation.

INDUSTRIAL APPLICABILITY

The disclosed methods and systems may provide ways to collect and report work machine operational data in an efficient manner. In particular, one disclosed method and system may be used to transmit data associated with one work machine in response to the transmission of data from another work machine Another disclosed method and system may be used to transmit data from a single independent work machine in response to a geographical location of the work machine. The operation of data system 12 will now be explained.

As illustrated in flowchart 60 of FIG. 4, the first step of operating data system 12 (referring to the embodiment of FIG. 1), after collection of operational data associated with work machine(s) 10, may include offboard control system 16 requesting a transmission of operational data from a first work machine 10*b* (Step 100). The request may be initiated at a particular time of day, on a particular day or date, or at particular intervals within a particular time period. Each of these time parameters may be permanently stored within offboard control system 16 or, alternatively, set by an operator, as desired. It is further contemplated that the time/date/interval information may alternatively be stored within the memory of controller 22 and the transmission of data from first work machine 10 automatically initiated without the request from offboard control system 16

Following the request for transmission, offboard control system 16 may wait for a communication from work machine 10. Once offboard control system 16 has determined that a transmission has been received (Step 110), offboard control system 16 may then request a transmission of operational data from a second work machine 10*a* (Step 120). If no transmission is received from first work machine 10*b*, offboard control system may re-request a transmission of data from first work machine 10*b*. It is contemplated that the re-request may be made after a predetermined lapsed period of time.

An alternative control path may be followed with respect to flowchart 60 of FIG. 4. In particular, after receiving the requested transmission from first work machine 10*b*, offboard control system 16 may then compare the transmitted data to a predetermined dependency definition (Step 130). A dependency definition may include an operator-set condition that, when met, triggers a predefined action (i.e., requesting the data transmission from the second work machine 10*a*). The operator-set conditions may be entered via input device 48 and could include for example, an accumulated fuel consumption value, a progress measurement associated with a predetermined task, a travel speed, or any other condition known in the art. Once the transmitted data from the first work machine 10*b* has been compared to the dependency definition, offboard control system 16 may then determine whether or not the definition has been satisfied. (e.g., whether or not the operator-set condition has been met) (Step 140). If the dependency definition has been satisfied, offboard system may then request the transmission from the second work machine 10*a* (Step 120). Otherwise, offboard control system 16 may continue to request transmissions from first work machine 10*b* (return to Step 100) until the dependency definition is satisfied. As described above, the request may be continuous, periodic, or based on an operator selected time, day, date, or interval.

The method described above and outlined within flowchart 60 of FIG. 4 may be most applicable to situations where two work machines are working in tandem or when the operation of a first work machine is dependent on the operation of a second work machine. In one example, the first work machine 10 could be the dozer 10*b* illustrated within FIG. 1, while the second work machine 10 could be the haul truck 10*a*. Haul truck 10*a* could be scheduled to work at a common work site with dozer 10*b*, but only after dozer 10*b* has gathered enough material to load haul truck 10*a*. While dozer 10*b* gathers the material to load into haul truck 10*a*, haul truck 10*a* may be efficiently tasked to a second site. In this instance, after receiving a transmission of data from dozer 10*b* indicating that the appropriate amount of material has been gathered, a transmission from haul truck 10*a* may be requested to determine the progress or location of haul truck 10*a* at the second site. In this manner, haul truck 10*a* may be redirected to the original task of removing the overburden material at the appropriate time with respect to the progress of dozer 10*b*, but only after efficiently completing the additional task at the second site. By only requesting a data transmission from haul truck 10*a* after the transmission from dozer 10*b* has been received, the number of communications and computing processes may be kept to a minimum. By reducing the number of communications and computing processes, the airwaves may be kept free for other communication needs and the necessary computing power may be lower and less expensive.

As illustrated in flowchart 62 of FIG. 5, the first step of operating data system 12 of the embodiment illustrated in FIG. 3, after collection of operational data associated with work machine(s) 10, may include onboard data collection system 14 determining the location of work machine 10 via locating device 56 (Step 200). Once the location of work machine 10 has been determined, the location may be compared to one or more predetermined dependency boundaries (Step 210). A dependency boundary may include, for example, an operator-set geographical boundary. If the determined location of work machine 10 lies within the operator-set dependency boundary, communication module 20 may be triggered to transmit the previously collected operational data associated with work machine 10 (Step 220). However, if the determined location of work machine 10 lies outside of the dependency boundary, control may return to step 200, where locating device 56 again determines the location of work machine 10. In this manner, machine operating parameters may only be transmitted to offboard control system 16 when work machine 10 crosses the dependency boundary.

Similar to flowchart 60, flowchart 62 contains an alternative method of operating data system 12 of FIG. 3. In particular, if more than one dependency boundary has been set, the location of work machine 10 may be compared to each of the dependency boundaries to determine within which of the dependency boundaries work machine 10 is operating (Step 230).

Data system 12 may be operated differently depending on which of the operator-set boundaries encompasses work machine 10. Specifically, if work machine 10 is determined to be operating within a first dependency boundary, communication module 20 may be triggered to transmit operational data associated with a first machine parameter or a first set of machine parameters (Step 240). In contrast, if work machine 10 is determined to be operating within a second dependency boundary, communication module 20 may be triggered to transmit operational data associated with a second machine parameter or a second set of machine parameters (Step 250). In this manner, only those parameters pertinent to the specific geographic regions may be transmitted to offboard control system 16.

The method described immediately above and outlined within flowchart 62 of FIG. 5 may be most applicable to a single independently tasked work machine, where knowledge of operational parameters associated with a particular work site may be beneficial. In one example, work machine 10 could be the haul truck 10*a* illustrated within FIG. 3. Haul truck 10*a* could be simultaneously tasked with hauling material to or from two co-located, separately owned or operated worksites on an as-needed basis. Each owning or operating entity may desire to know different operational characteristics of the haul truck 10*a* as it is working within the different worksites. For example, one entity may be interested in payload monitoring, while another may be interested only in cycle times. By transmitting differing data reports according to dependency boundaries, the needs of both entities may be efficiently satisfied.

In addition, when a single work machine 10 is shared by separate entities, the entities may be interested in accurately tracking their share of the work machine operating costs. Cost distributions may be simplified by tracking and reporting performance of the work machine according to the dependency boundaries. For example, the separate entities may be billed according to the amount of time or fuel spent within the separate dependency boundaries. By requesting a transmission each time the dependency boundaries are traversed by work machine 10, an accurate count may be attained.

It will be apparent to those skilled in the art that various modifications and variations can be made to the method and system of the present disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A data system, comprising:

a first communication device associated with a first machine;

a second communication device associated with a second machine; and an offboard system in communication with the first and second communication devices, the offboard system being configured to receive a first data transmission from the first machine and to request a second data transmission from the second machine only in response to receiving the first data transmission from the first machine.

2. The data system of claim 1, wherein the first data transmission includes operational information associated with the first machine and the second data transmission includes operational information associated with the second machine.

3. The data system of claim 2, further including at least a first sensor associated with the first machine and at least a second sensor associated with the second machine, wherein the operational information associated with the first machine is collected by the at least a first sensor and the operational information associated with the second machine is collected by the at least a second sensor.

4. The data system of claim 2, wherein the offboard system is configured to request the first data transmission only in response to a dependency definition associated with the operational information of the second machine being satisfied.

5. The data system of claim 4, wherein the dependency definition is manually set.

6. The data system of claim 4, wherein the dependency definition is associated with progress of the second machine in completion of a predetermined task.

7. The data system of claim 4, wherein the dependency definition is associated with an accumulated fuel consumption by the second machine.

8. The data system of claim 1, wherein the first and second data transmissions are communicated wirelessly.

9. The data system of claim 4, wherein the dependency definition is associated with a travel speed of the second machine.

10. A method of reporting data, comprising:

providing a first communication device associated with a first machine, a second communication device associated with a second machine, and an offboard system in communication with the first and second communication devices; and receiving, into the offboard system, a first data transmission from the first machine; and requesting, via the offboard system, a second data transmission from a second machine only in response to receiving the first data transmission from the first machine.

11. The method of claim 10, further including collecting operational information from the first machine and collecting operational information from the second machine, wherein the first and second data transmissions include the operational information collected from the first and second machines, respectively.

12. The method of claim 11, further including comparing the operational information collected from the first machine to a dependency definition and only requesting the second data transmission when the dependency definition has been satisfied.

13. The method of claim 11, further including receiving the dependency definition via a user interface.

14. The method of claim 12, wherein the dependency definition is associated with progress of a predetermined task by the second machine.

15. The method of claim 12, wherein the dependency definition is associated with an accumulated fuel consumption by the second machine.

16. The method of claim 12, wherein the dependency definition is associated with a travel speed of the second machine.

* * * * *